Patented Oct. 15, 1929

1,731,484

UNITED STATES PATENT OFFICE

WILLIAM C. GEER, OF NEW ROCHELLE, NEW YORK, ASSIGNOR TO THE B. F. GOODRICH COMPANY, OF NEW YORK, N. Y., A CORPORATION OF NEW YORK

RUBBER COMPOSITION AND METHOD OF MAKING THE SAME

No Drawing. Application filed April 23, 1924, Serial No. 708,585. Renewed January 16, 1929.

This invention relates to compositions made from or containing rubber, and its chief object is to provide heat plastic compositions adapted for use as electrical insulation in marine cables, insulated wires and the like. A more particular object is to provide compositions resembling gutta percha in physical properties. A further object is inexpensively to provide materials of these characteristics which will be more pure and uniform in character then unextracted gutta percha as ordinarily produced. Another more specific object is to provide a class of plastic resembling gutta percha and having a low degree of water permeability or absorption, especially adapting them, for example, for use as insulation in submarine cables or the like.

My invention in its broad aspect contemplates forming a heat-plastic rubber composition in general accordance with practices heretofore employed by others, and hereinafter described, such practices being adapted to produce compositions having heat-plasticity and desirable electrical properties but in some instances lacking in certain physical properties which are desirable in particular uses, and combining with or incorporating in such a composition an ingredient adapted to soften the same and to produce therewith a homogeneous, heat plastic substance, and more particularly to produce a substance characterized by a very high degree of heat-plasticity at a temperature readily attained for forming the mass, as by means of a tubing machine, but a substance which will be at the same time tough, flexible and resistant to cold flow throughout the range of temperature in which the material is to be used.

Materials heretofore have been prepared from rubber by reacting upon the rubber with reagents having the general formula $R-SO_2-X$ wherein R represents an organic radical or a hydroxy group and X represents chlorine or a hydroxy group, such as sulfuric acid, a sulfonyl chloride, a sulphonic acid, or mixtures of these reagents, in such proportions and at such temperatures as to produce heat plastic, rubber reaction products, either hard, tough, non-grindable products of relatively low softening temperatures similar to balata, or hard, brittle, pulverizable products remoldable at moderately high temperatures and similar in these respects to shellac. I find that such products may be mixed with certain materials, whereby a substance may be produced having the desired properties mentioned in the above statement of objects.

Examples of materials which may be thus employed, with greater or less softening effect according to the material used and the manner of incorporation, are ordinary raw rubber, vacuum-softened rubber, naphthylene, paraffine, ceresin, pine tar, stearic acid, palm oil, oil of birch tar, mineral oil, cotton seed pitch, vegetable oils, blown vegetable oils, sassafras oil, oleic acid, sulfonated castor oil, beechwood creasote, lard oil, degras oil.

While the process may be widely varied as to the softener and as to the curing agent used, and corresponding products differing throughout a wide range thereby may be obtained, the following examples will serve to illustrate the preferred forms of procedure, various modifications of which will be obvious:

*Example I.*—1000 parts by weight of crude rubber is warmed upon a rubber mill and 75 parts of phenol sulphonic acid is mixed into the batch. The mixed batch then preferably is formed into a compact mass, placed in a suitable container, put into a dry heat oven, and the temperature of the latter is kept at approximately 285° F. for six hours, resulting in a highly exothermic reaction with substantially higher temperature within the mass. The product is then removed from the oven and thoroughly worked on a mill to insure complete homogeneity, the product resembling balata or gutta percha in many respects. It is not sufficiently plastic, however, to be readily calendered or forced through a tubing machine. 1800 parts of this plastic and 200 parts of crude rubber, vacuum dried for six hours at about 286° F. are thoroughly mixed on a rubber mill, providing a tough, flexible material which can be calendered, tubed, moulded or otherwise treated as desired for the uses described above.

The product obtained as above described has such heat-plasticity as to be readily workable and in other respects approximates the properties of gutta percha, both at room temperature and upon being heated, and has a substantially higher resistance to water absorption, as to sea water as well as to distilled water, which makes it desirable for use in submarine cables. It also has a lower dielectric constant than gutta percha, which contributes to its desirability for electrical insulating purposes.

*Example II.*—1000 parts by weight of crude rubber, and 75 parts of phenol sulfonic acid are intimately mixed on a rubber mill and cured in the same manner as described in Example 1. The product is then intimately mixed with 50 parts of paraffin, pine tar, or the like. The resultant product is more plastic than the rubber reaction product and tubes and calenders smoothly.

*Example III.*—1000 parts of crude rubber, and 100 parts of p-toluene-sulfonyl-chloride are thoroughly mixed and the mass formed into sheets approximately ½ inch in thickness. These sheets are heated for 8 hours at 210° F., cooled and reheated for 8 hours at 230° F., care being taken to prevent substantial rise in temperature inside the mass above the temperature of the oven. The product is then intimately mixed with 30 parts of stearic acid. The mixture is a tough but pliable plastic which may be tubed and calendered but which hardens and approaches the characteristics of shellac by further reaction of its ingredients, as upon long standing or upon being hot molded.

*Example IV.*—1000 parts by weight of rubber, and 100 parts of p-toluene sulfonic acid are mixed and sheeted to approximately ¾ inch in thickness. The sheets are heated in an oven for 12 hours at 230° F., followed by 6 hours at 250° F. and finally for 18 hours at 270° F. The product is then intimately mixed with 100 parts of pine tar. The mixture closely resembles gutta percha in its physical and electrical properties and is easily tubed or calendered.

The products described above are desirable substitutes for balata or gutta percha in many of their well known uses. In some cases, however, they exhibit a greater degree of cold flow under dead load than is desirable for cable work and the like.

On examination of gutta percha it is noted that it has an internal structure as shown by the whitening effect produced by stretching. This seems to indicate that gutta percha is an emulsion or suspension of two or more substances. This is further indicated by the fact that similar resistance to cold flow and a similar whitening effect is observed in raw rubber in which large amounts of shellac, lime or animal glue have been incorporated. Such materials as lime or glue, however, may not be used for this purpose in electrical insulation due to their hygroscopic nature. A similar whitening effect, accompanied by increased resistance to cold flow, is observed in mixtures of shellac-like rubber derivatives with crude rubber, but such mixtures are unstable as to their structure, and become hard and brittle upon standing, wherefore they are unsuited for many uses as gutta percha substitutes.

I find, however, that the shellac-like derivatives of rubber, when properly incorporated in the final plastic product of any of the above examples, will impart thereto the desired property of resistance to cold flow and at the same time provide a mixture which is stable as to its structure.

As an example of procedure for obtaining a shellac-like rubber derivative for this purpose, I mix rubber—100, p-toluene surfonic acid—8 and sulfuric acid (sp. gr. 1.84)—2 (parts by weight) and heat the mass for 7½ hours at 190° F., followed by 10 hours at 266° F. or for such time and at such temperature as to produce in the mass a pronounced exothermal reaction.

The following are examples of my preferred method of producing a gutta percha substitute having high resistance to cold flow in addition to the properties of the products obtained in Examples I to IV above.

*Example V.*—42.5 parts by weight of a shellac-like derivative of rubber, 32.5 parts of a balata-like derivative of rubber, and 25.0 parts of crude rubber are fluxed and mixed on a rubber mill. This mixing is preferably accomplished by melting the shellac-like substance on a hot mill and adding the other two ingredients in the order mentioned. A whitening effect is first observed in the mass and the milling of the hot mix is continued until the cloudiness disappears and a thin test sheet has a deep black, uniform appearance.

*Example VI.*—Rubber is vulcanized with a small amount of sulfur and organic accelerator and the cured rubber is broken down and fluxed to a uniform plastic mass. This rubber is substituted for the crude rubber added to the plastic in Example V.

The products described in Examples V and VI represent my preferred class of gutta-percha-like materials. They may be easily and smoothly calendered or tubed, and when cold are equal or superior to gutta percha with respect to cold flow, dielectric constant or water absorption.

The ingredients and the procedure as described may be variously modified to produce compositions of different characteristics particularly adapting them, for example, for molding as well as for calendering and tubing, wherefore I do not wholly limit my claims to the specific ingredients or proportions, or to the exact procedure described.

I claim:

1. A composition of matter comprising an intimate mixture of (1) a hard, tough, non-grindable, thermo-plastic reaction product of rubber with a reagent having the general formula R—SO$_2$—X, wherein R represents an organic radical or a hydroxy group and X represents chlorine or a hydroxy group, and (2) a material adapted to modify the plasticity of said product.

2. A composition of matter comprising an intimate mixture of (1) a hard, tough, non-grindable, thermo-plastic reaction product of rubber with a reagent having the general formula R—SO$_2$—X, wherein R represents an organic radical or a hydroxy group and X represents chlorine or a hydroxy group, and (2) a softener.

3. A composition of matter comprising an intimate mixture of (1) a hard, tough, non-grindable, thermo-plastic reaction product of rubber with a reagent having the general formula R—SO$_2$—X, wherein R represents an organic radical or a hydroxy group and X represents chlorine or a hydroxy group, and (2) uncured rubber.

4. A composition of matter comprising an intimate mixture of (1) a hard, tough, non-grindable, thermo-plastic reaction product of rubber with a sulfonic acid, and (2) a material adapted to modify the degree of plasticity of such products.

5. A composition of matter comprising an intimate mixture of (1) a hard, tough, non-grindable, thermo-plastic reaction product of rubber with a sulfonic acid, and (2) a softener.

6. A composition of matter comprising an intimate mixture of (1) a hard, tough, non-grindable, thermo-plastic reaction product of rubber with a sulfonic acid, and (2) uncured rubber.

7. A composition of matter comprising an intimate mixture of (1) a hard, friable, thermo-plastic derivative of rubber, (2) a hard, tough, non-grindable, thermo-plastic derivative of rubber, and (3) a material adapted to modify the degree of plasticity of the mixture.

8. A composition of matter comprising an intimate mixture of (1) a hard, friable, thermo-plastic derivative of rubber, (2) a hard, tough, non-grindable, thermo-plastic derivative of rubber, and (3) a softener.

9. A composition of matter comprising an intimate mixture of (1) a hard, friable, thermo-plastic derivative of rubber, (2) a hard, tough, non-grindable, thermo-plastic derivative of rubber, and (3) uncured rubber.

10. The method of producing a composition of matter which comprises effecting a reaction between rubber and a reagent having the general formula R—SO$_2$—X, wherein R represents an organic radical or a hydroxy group and X represents chlorine or a hydroxy group, under such conditions as to time, temperature and proportions as to produce a hard, tough, non-grindable, thermo-plastic reaction product, and mixing with said product a material adapted to modify the plasticity thereof.

11. The method of producing a composition of matter which comprises effecting a reaction between rubber and a reagent having the general formula R—SO$_2$—X, wherein R represents an organic radical or a hydroxy group and X represents chlorine or a hydroxy group, under such conditions as to time, temperature and proportions as to produce a hard, tough, non-grindable, thermo-plastic reaction product, and mixing a softener with said product.

12. The method of producing a composition of matter which comprises effecting a reaction between rubber and a reagent having the general formula R—SO$_2$—X, wherein R represents an organic radical or a hydroxy group and X represents chlorine or a hydroxy group, under such conditions as to time, temperature and proportions as to produce a hard, tough, non-grindable, thermo-plastic reaction product, and mixing uncured rubber with said product.

13. The method of producing a composition of matter which comprises effecting a reaction between rubber and a sulfonic acid under such conditions as to time, temperature and proportions as to produce a hard, tough, non-grindable, thermo-plastic reaction product, and mixing with said product a material adapted to modify the plasticity thereof.

14. The method of producing a composition of matter which comprises effecting a reaction between rubber and a sulfonic acid under such conditions as to time, temperature and proportions as to produce a hard, tough, non-grindable, thermo-plastic reaction product, and mixing a softener with said product.

15. The method of producing a composition of matter which comprises effecting a reaction between rubber and a sulfonic acid under such conditions as to time, temperature and proportions as to produce a hard, tough, non-grindable, thermo-plastic reaction product, and mixing uncured rubber with said product.

16. The method of producing a composition of matter which comprises intimately mixing a hard, friable, thermo-plastic derivative of rubber, a hard, tough, non-grindable thermo-plastic derivative of rubber, and a material adapted to modify the plasticity of the mix.

17. The method of producing a composition of mattter which comprises intimately mixing a hard, friable thermo-plastic derivative of rubber, a hard, tough non-grindable thermo-plastic derivative of rubber, and a softener.

18. The method of producing a composition of matter which comprises intimately mixing a hard, friable, thermo-plastic derivative of rubber, a hard, tough, non-grindable thermo-plastic derivative of rubber, and uncured rubber.

In witness whereof I have hereunto set my hand this 17th day of April, 1924.

WILLIAM C. GEER.